United States Patent
Park

(10) Patent No.: US 7,284,309 B2
(45) Date of Patent: Oct. 23, 2007

(54) SHOCK ABSORBER REPLACEMENT APPARATUS

(76) Inventor: Sung-Hyun Park, 432-2, Donggyo-dong Pocheon-si, Gyeonggi-do (KR)

( * ) Notice: Subject to any disclaimer, the term of this patent is extended or adjusted under 35 U.S.C. 154(b) by 275 days.

(21) Appl. No.: 11/185,178

(22) Filed: Jul. 20, 2005

(65) Prior Publication Data

US 2006/0016059 A1    Jan. 26, 2006

(30) Foreign Application Priority Data

Jul. 22, 2004    (KR) .................. 20-2004-0020951 U

(51) Int. Cl.
*B23P 19/04* (2006.01)
(52) U.S. Cl. .............................. 29/252; 29/225; 29/227
(58) Field of Classification Search .................. 29/252, 29/255, 225–228, 230, 238; 269/17; 254/2 R
See application file for complete search history.

(56) References Cited

U.S. PATENT DOCUMENTS

| | | | | |
|---|---|---|---|---|
| 4,752,173 A * | 6/1988 | Fleming | ...................... | 414/10 |
| 5,269,501 A * | 12/1993 | Liegel et al. | .................. | 269/17 |
| 5,505,578 A * | 4/1996 | Fuller | .......................... | 414/427 |
| 5,944,474 A * | 8/1999 | Cummins et al. | ........... | 414/621 |
| 6,364,328 B1 * | 4/2002 | Stahler, Sr. | .............. | 280/47.18 |
| 2006/0016059 A1 * | 1/2006 | Park | ........................ | 29/402.01 |

* cited by examiner

*Primary Examiner*—Lee D. Wilson
(74) *Attorney, Agent, or Firm*—Ladas & Parry LLP

(57) ABSTRACT

An apparatus for replacing a shock absorber for another for automobiles, which supports and compresses a coil spring in a strut type suspension, in correspondence to various dimensions of shock absorbers is provided. The shock absorber replacement apparatus includes: a movable cart having a flat support table, wheels and a handle; an air cylinder installed on the support table; a fixed frame installed on a cylinder head of the air cylinder; a strut fixing unit which fixes and supports a lower portion of the strut onto the fixed frame; a rotatable semi-circular clip arm installed in an end of a piston rod of the air cylinder; a clip which is hung on the upper portion of a coil spring toward an end of the clip arm; and an air opening and closing pedal which opens and closes an air pressure to be introduced to upper and lower cylinder chambers of the air cylinder and thus descends and ascends the piston rod.

4 Claims, 3 Drawing Sheets

SHOCK ABSORBER REPLACEMENT APPARATUS

BACKGROUND OF THE INVENTION

1. Field of the Invention

The present invention relates to an apparatus for replacing a shock absorber for another in a McPherson's strut type suspension which is installed at the front drive of automobiles, and more particularly, to a shock absorber replacement apparatus which supports and compresses a coil spring in a strut type suspension, so that the coil spring can be stably compressed during performing a replacement work, and the replacement work can be performed in correspondence to various dimensions of shock absorbers, in order to replace a shock absorber constituting a strut type suspension for another.

2. Description of the Related Art

In general, a strut type suspension chiefly connects a wheel axle with a car body at the front drive of an automobile car and buffers and support a knuckle arm. The strut type suspension integrally includes a shock absorber and a coil spring in a strut, in which the upper portion of the strut is connected to the car body through a support and the lower portion thereof is integrally connected to a steering knuckle.

The strut type suspension absorbs impact transferred from the ground surface through wheels during running of the automobile car and attenuates vibration of the car body, to thus make riders feel comfortable. However, when a total running distance of an automobile car becomes longer or severe impact is applied to the front drive of the automobile car, a shock absorbing function of a shock absorber is lowered. Accordingly, if the shock absorber is broken, impact transferred from the ground surface is directly transferred to the car body, and thus a running steering function and a comfortable riding feel are lowered. In severe cases, the shock absorber should be replaced with a new one.

When a shock absorber is replaced with a new one, a strut type suspension should be primarily separated from a steering knuckle and a car body and then mount bolts and nuts which are connected with a support located in the upper end of a piston rod in the shock absorber should be released and dismantled from the support at the state where a coil spring is compressed. Then, the shock absorber should be separated from the strut and replaced with a new one.

The most difficult work is a coil spring compression work when a shock absorber is replaced with a new one. Accordingly, a coil spring compressor for compressing a coil spring in a shock absorber is disclosed in Korean Utility Model Publication No. 96-777 on Jan. 27, 1996.

In the coil spring compressor for use in a shock absorber replacement apparatus for an automobile car, a hydraulic cylinder is installed on a fixed frame installed in the upper portion of a strut column and a strut gripper is installed with an interval downwards. A support rod in which a clip unit which hangs up a coil spring and a compression clip are installed is installed elastically by a spring in the upper portion between the hydraulic cylinder and the strut gripper. The strut gripper which is located in the lower portion between the hydraulic cylinder and the strut gripper is connected with a piston rod in the hydraulic cylinder.

In the above-described prior art, a strut located in the lower portion of the strut type suspension is fixed to the strut gripper and then the hydraulic cylinder is operated at the state where the coil spring is hung up with the compression clip through adjustment of the clip unit, to accordingly compress the coil spring. Then, the upper portion of the shock absorber is elastically released from the coil spring, and thus the mount bolts and nuts of the shock absorber can be released and separated from the coil spring. Then, after the hydraulic cylinder is operated to release the compression of the coil spring and to thus then completely separate the coil spring from the shock absorber, a shock absorber for replacement is position and re-fixed in the strut gripper and then the existing coil spring is fitted into the shock absorber. Then, in the reverse process, the shock absorber can be completely replaced.

Although the conventional shock absorber replacement apparatus can conveniently and easily achieve a replacement work of shock absorbers through a manual work, it cannot efficiently perform a replacement work of shock absorbers and strut type suspensions of a variety of dimensions.

For example, the conventional shock absorber replacement apparatus can grip only a strut type suspension belonging to an allowable range of an inner diameter of a hinge-type tightening tool in a strut gripper. Accordingly, suspensions having an outer diameter larger than the inner diameter of the hinge-type tightening tool and different shapes cannot be replaced.

In addition, in the conventional shock absorber replacement apparatus, a hydraulic cylinder is installed in one side of a strut column and the hydraulic cylinder is used as a power source to perform a replacement work. In this case, the coil spring is structurally unstably compressed.

SUMMARY OF THE INVENTION

To solve the above problems, it is an object of the present invention to provide a shock absorber replacement apparatus which supports and compresses a coil spring in a strut type suspension, so that the coil spring can be stably compressed during performing a replacement work, and the replacement work can be performed in correspondence to various dimensions of shock absorbers, in order to replace a shock absorber constituting a strut type suspension for another.

To accomplish the above object of the present invention, there is provided an apparatus for replacing a shock absorber with another, the shock absorber replacement apparatus comprising: a movable cart having a flat support table, wheels and a handle; an air cylinder installed on the support table; a fixed frame installed on a cylinder head of the air cylinder; a strut fixing unit which fixes and supports a lower portion of the strut onto the fixed frame; a rotatable semi-circular clip arm installed in an end of a piston rod of the air cylinder; a clip which is hung on the upper portion of a coil spring toward an end of the clip arm; and an air opening and closing pedal which opens and closes an air pressure to be introduced to upper and lower cylinder chambers of the air cylinder and thus descends and ascends the piston rod.

Preferably, the shock absorber replacement apparatus further comprises a guide which is installed in the air cylinder to guide a stroke of a piston.

Preferably, the lower fixing unit comprises a gripper and a tightening bolt which comprises a hinge which can surround and tighten the lower circumference of the strut, in order to fix the strut type suspension of a variety of dimensions and shapes.

Otherwise, the lower fixing unit comprises a connection bracket whose one end is fixed to the fixing frame and whose other end is fitted and coupled into the strut frame.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE INVENTION

A shock absorber replacement apparatus according to an embodiment of the present invention will be described below in more detail with reference to FIGS. 1 and 2.

Figure 1:
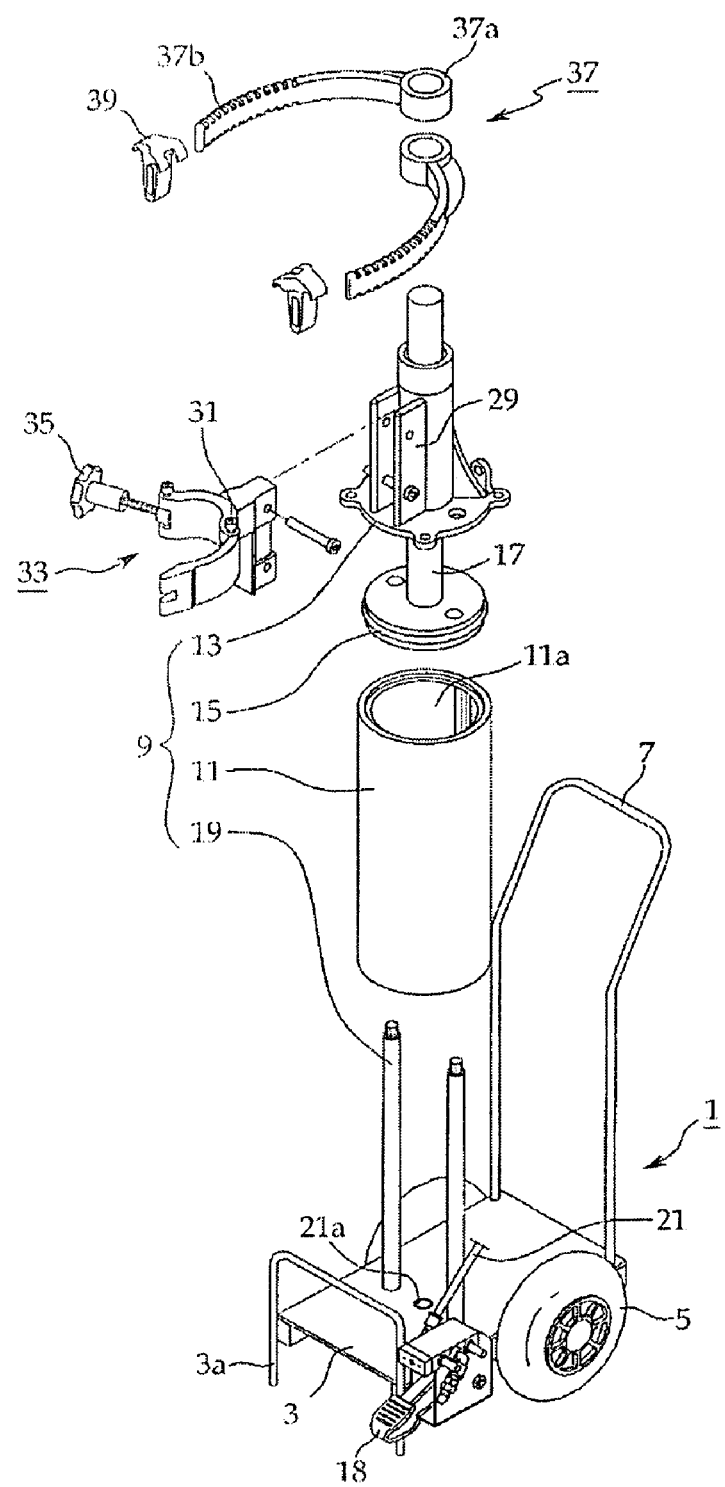
FIG. 1 is an exploded perspective view of a shock absorber replacement apparatus according to the present invention.
Figure 2:
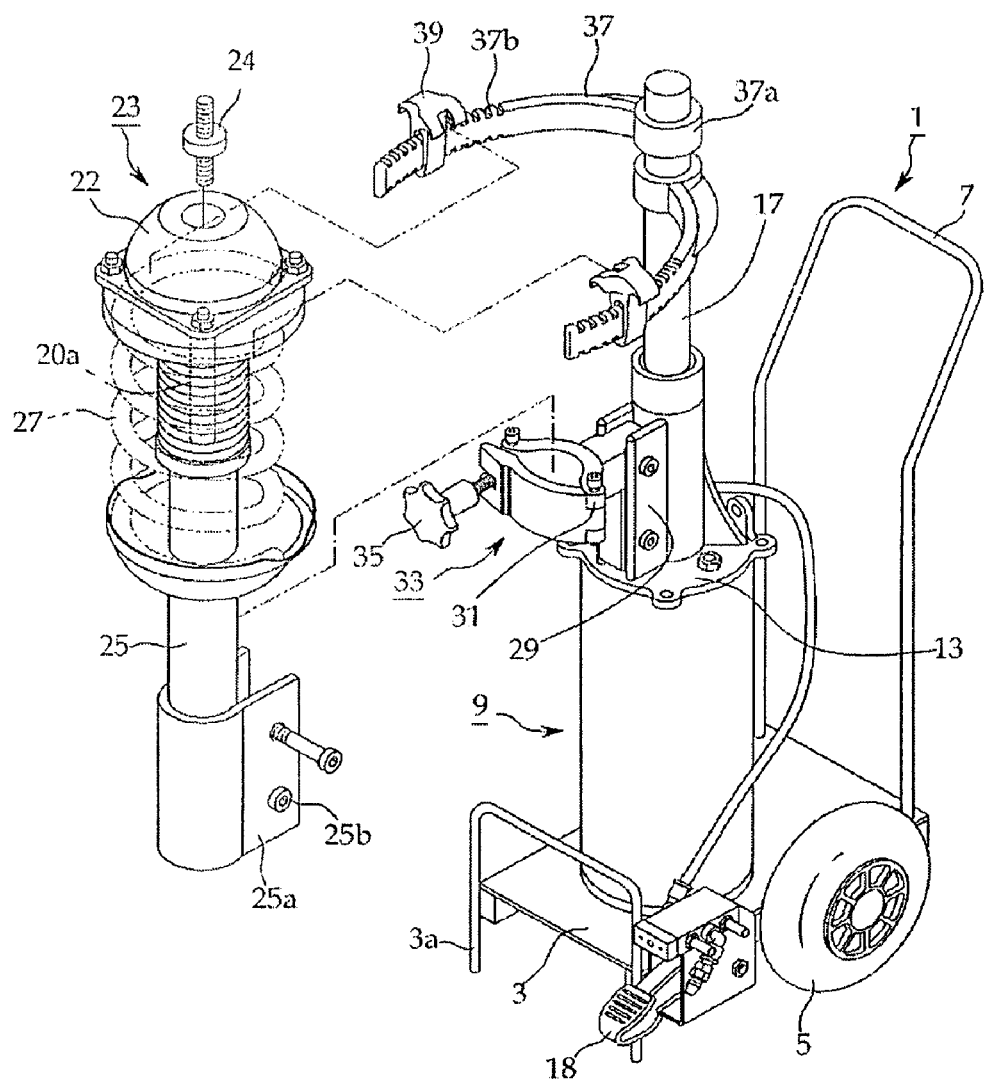
FIG. 2 is a perspective view showing a state of use of the shock absorber replacement apparatus according to the present invention.

Referring to FIGS. 1 and 2, the shock absorber replacement apparatus according to the embodiment of the present invention is fundamentally constituted so as to be conveniently moved. For this reason, the shock absorber replacement apparatus includes a cart 1 as a base structure thereof.

The cart 1 includes a flat shaped support table 3, two wheels 5 and a handle 7, so as to be conveniently moved, and further includes support legs 3a so as to easily stand erect on the floor.

An air cylinder 9 is erectly installed on the support table 3, as a power supply unit. The air cylinder 9 includes a cylinder block 11, a cylinder head 13, a piston 15, and a piston rod 17. In particular, in order to guide a stroke of the piston 15 more stably, guides 19 are installed in the air cylinder 9.

The guides 19 are fixed to the support table 3 and cylinder head 13 and erectly stand. It is preferable that at least two guides are installed in order to prevent the piston 15 from rotating and support the piston 15 more stably.

An air line 21 which supplies an air pressure supplied from an air compressor (not shown) is connected to an upper cylinder 11a of the piston 15. Accordingly, the piston 15 and the piston rod 17 descend. Also, another air line 21 which supplies the lower cylinder with an air pressure to ascend the piston 15 and the piston rod 17 is connected with the lower hole 21a at the center of the support table 3.

Meanwhile, an air opening and closing pedal 18 which opens and closes an air pressure to be introduced to upper and lower cylinder chambers of the air cylinder is installed between the air compressor and the air line 21. Also, the air opening and closing pedal 18 includes a valve (not shown) which selectively opens and closes an air pressure which is supplied to two air lines 21 and is installed on one side of the cart 1, to thus descend and ascend the piston rod.

On one end of the air cylinder 13 and the piston rod 17 is installed a fixing unit for substantially supporting, fixing and compressing the lower strut 24 and the upper coil spring 27 in the strut type suspension 23.

In more detail, in order to grip the lower strut 25 in the strut type suspension 23, a fixed frame 29 is installed on a cylinder head 13 of the air cylinder 9, and a gripper 33 including a hinge 31 which can surround and tighten the lower circumference of the strut 25 is installed in the fixing frame 29. The gripping unit 33 can be engaged by a tightening bolt 35.

Also, in order to fix and support the upper coil spring 27 in the strut type suspension 23, two rotatable semi-circular clip arms 37 are installed in the end of the piston rod 17, and a clip 39 which can move and be substantially hung up on the upper portion of the coil spring 27 is installed toward the end of the clip arm 37.

Each clip arm 37 includes a rotating boss 37a and a number of hanging recesses 37b which can shift the clip 39 stepwise.

Based on the above-described structure, operation of the shock absorber replacement apparatus will be described below.

The strut 25 in the strut type suspension 23 is fitted into a gripper 33 and then is tightened by a tightening bolt 35. Then, the clip 39 is hung up on the upper portion of the coil spring 27 in the strut type suspension 23.

When an air pressure is applied to the upper cylinder 11a in the air cylinder 9 at the state where the clip 39 is hung up on the coil spring 27, the piston rod 17 descends and compresses the coil spring 27.

The piston rod 20a in the shock absorber 20 is exposed at the state where the coil spring 27 has been compressed, and the support 22 attached on the upper end thereof is also released from an elastic force of the coil spring 27. Accordingly, the nut 24 is released by a known method and the support 22 is separated from the piston rod 20a. Then, the broken shock absorber 20 is removed from the strut 25 and replaced with a new one.

Thereafter, in the reverse process, a new shock absorber is mounted. When an air pressure is supplied to the lower cylinder chamber in the air cylinder 9 to release a compression force of the coil spring 27. Thus, all the processes of the restoring work and the replacement work of the strut type suspension 23 can be completed.

Figure 3:
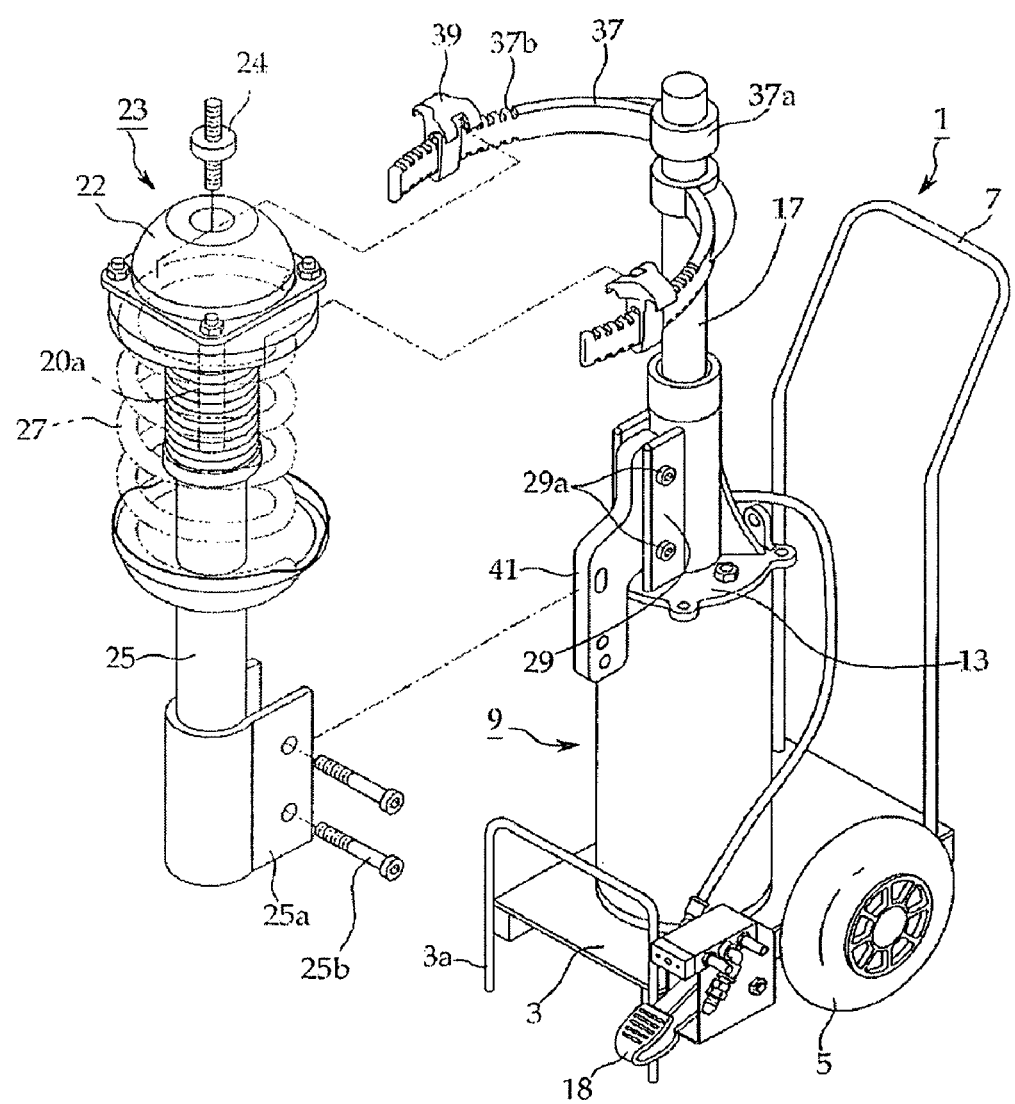
FIG. 3 is a perspective view showing a state of use of a shock absorber replacement apparatus according to another embodiment of the present invention.

FIG. 3 is a perspective view showing a state of use of a shock absorber replacement apparatus according to another embodiment of the present invention.

As can be seen from FIG. 3, the structure of FIG. 3 is similar to that of FIG. 2. In FIG. 3, considering various dimensions or shapes of strut type suspensions 23, a different structure of a strut fixing unit which supports the lower strut 25 in the strut type suspension 23 is proposed.

In more detail, the fixing frame 29 is installed in the cylinder head 13, and a separate connection bracket 41 is interposed into the fixing frame 29, so that the strut type suspension 23 can be fixed.

The connection bracket 41 is mounted on the fixing frame 29 by means of the fixing bolts 29a, and is inserted into the strut frame 25a. Then, the connection bracket 41 is coupled using the fixing bolts 25b, to thus fix the lower strut 25 in the strut type suspension 23.

As described above, the shock absorber replacement apparatus according to the present invention can perform a compression work of a coil spring in a strut type suspension more stably, using a strut fixing unit and a clip which are detachably and replaceably mounted on a fixing frame, and the replacement work can be performed in correspondence to various dimensions of shock absorbers.

Also, the shock absorber replacement apparatus according to the present invention can obtain an effect of transporting and carrying it conveniently because of using a cart.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. An apparatus for replacing a shock absorber for another for automobiles, which supports and compresses a coil spring in a strut type suspension, in correspondence to various dimensions of shock absorbers, the shock absorber replacement apparatus comprising:
    a movable cart having a flat support table, wheels and a handle;
    an air cylinder installed on the support table;
    a fixed frame installed on a cylinder head of the air cylinder;
    a strut fixing unit which fixes and supports a lower portion of the strut onto the fixed frame;
    a rotatable semi-circular clip arm installed in an end of a piston rod of the air cylinder;
    a clip which is hung on the upper portion of a coil spring toward an end of the clip arm; and
    an air opening and closing pedal which opens and closes an air pressure to be introduced to upper and lower cylinder chambers of the air cylinder and thus descends and ascends the piston rod.

2. The shock absorber replacement apparatus of claim 1, further comprising a guide which is installed in the air cylinder to guide a stroke of a piston.

3. The shock absorber replacement apparatus of claim 1, wherein the lower fixing unit comprises a gripper and a tightening bolt which comprises a hinge which can surround and tighten the lower circumference of the strut.

4. The shock absorber replacement apparatus of claim 1, wherein the lower fixing unit comprises a connection bracket whose one end is fixed to the fixing frame and whose other end is fitted and coupled into the strut frame.

* * * * *